Sept. 24, 1940.   R. G. SCHAAF, JR   2,215,566
SEALING MEANS FOR INDICATING INSTRUMENT CASINGS
Filed May 11, 1939
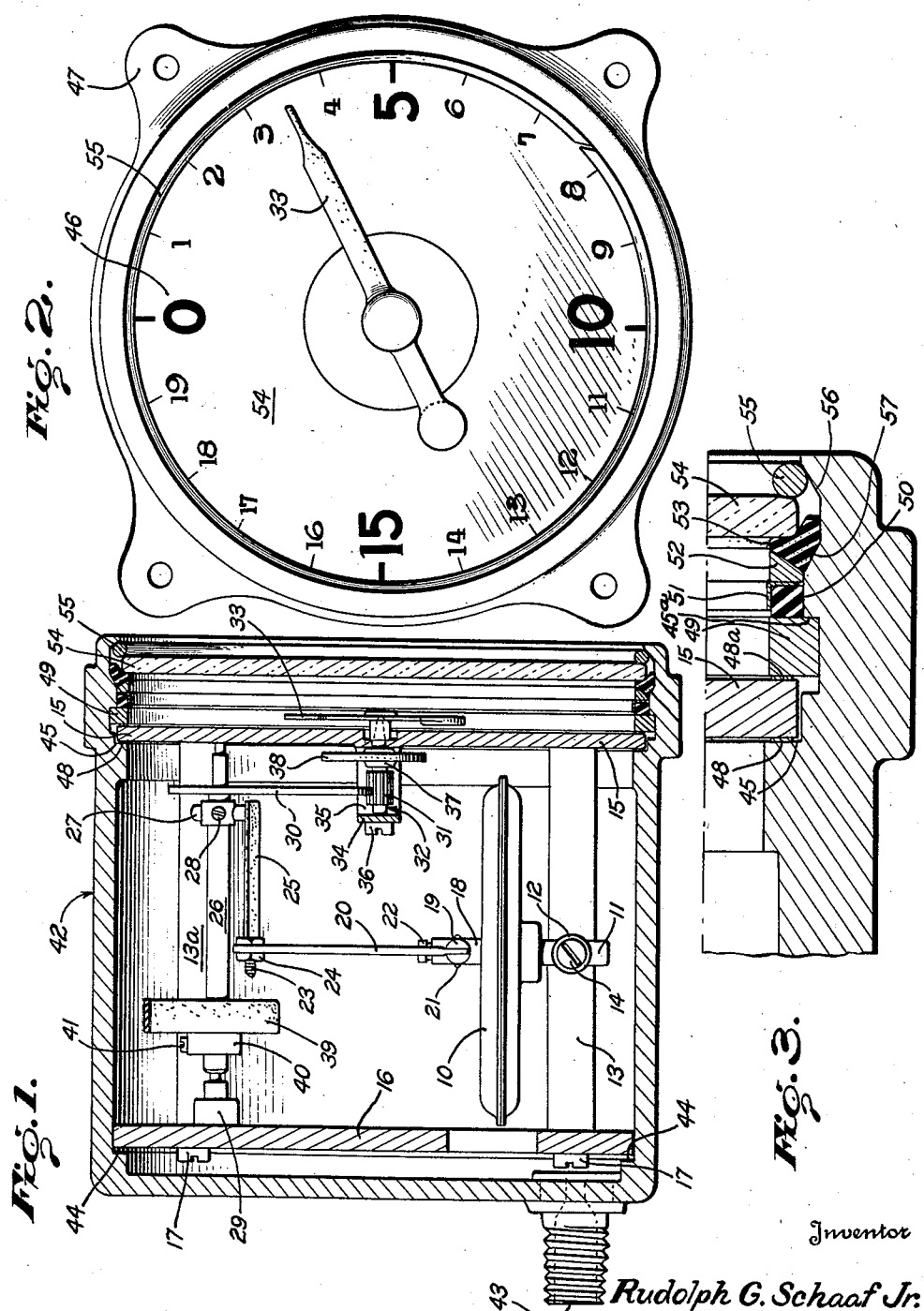
Inventor
Rudolph G. Schaaf Jr.
By Stephen Cerstvik
Attorney Patented Sept. 24, 1940

2,215,566

UNITED STATES PATENT OFFICE 2,215,566

SEALING MEANS FOR INDICATING INSTRUMENT CASINGS

Rudolph G. Schaaf, Jr., Great Neck, N. Y., assignor to Bendix Aviation Corporation, South Bend, Ind., a corporation of Delaware Application May 11, 1938, Serial No. 207,394

5 Claims. (Cl. 73—151)

The present invention relates to indicating instruments and more particularly to indicating instruments of the pressure actuated type, such for example as altimeters, air-speed indicators, manifold pressure indicators, rate of climb devices and the like.

More specifically, the present invention relates to novel means for sealing the casing of a pressure-responsive indicating instrument and for locking the indicating mechanism thereof within the casing whereby the pressure inside of the casing may be maintained free of disturbances by any existing extraneous pressures, and whereby the mechanism is locked in position against vibration, and is an improvement on the invention as disclosed in the copending application of Roy C. Sylvander, Serial No. 207,392, filed May 11, 1938.

Similar devices of the prior art have been utilized heretofore in order to seal the casings of pressure-responsive indicating instruments and to lock the indicating mechanisms therein, but such devices have been affected by changes in temperature, and have been subjected to undesired leakage so that they did not satisfactorily maintain the pressure inside of the casings of such instruments free from disturbances due to extraneous pressures. Further, devices of the prior art have failed to maintain the mechanisms tightly in place in the casings due to failure of the closure means to take up play between the indicating mechanisms and the casings due to tolerances in machining the casings during manufacture in large quantities, and have further failed to provide a proper clinching action for maintaining the mechanisms in place in the casings against vibration or other disturbing factors. In view of the above conditions prevailing in the prior art, one of the objects of the present invention is to provide novel closure means for indicating instrument casings, whereby the foregoing undesirable characteristics are eliminated.

Another object is to provide, in a pressure-responsive indicating instrument, novel casing closure elements which are not affected by temperature changes or by vibration.

A further object is to provide a pressure-responsive indicating instrument comprising a casing, a pressure-responsive mechanism in said casing, and means for sealing the mechanism in the casing, comprising novel means for taking up any irregularities in said casing due to tolerances existing in the manufacture thereof.

Still another object of the invention is to provide, in a pressure-responsive indicating instrument, a casing, a pressure-responsive mechanism in said casing, and means for sealing the mechanism in said casing, comprising novel means for resiliently sealing said casing against pressure leaks.

Still another object is to provide, in a pressure-responsive indicating instrument, a casing, a pressure-responsive mechanism in said casing, and means for sealing the mechanism in said casing, comprising a mechanism plate, a spacing ring, a cushion of resilient material, such as rubber, abutting said spacing ring, cushion retaining means abutting said resilient cushion, a sealing ring, a resilient sealing gland, a cover-glass, and resilient means cooperating with said casing to urge said cover-glass and sealing means together against said retainer to seal the mechanism in said casing against pressure variations therein.

The above and further objects and advantages of the present invention will appear more fully hereinafter from a consideration of the detailed description which follows, taken together with the accompanying drawing wherein is illustrated one embodiment of the invention.

It is to be expressly understood, however, that the drawing is for purposes of illustration and description only, and is not designed as a definition of the limits of the invention, reference primarily being had for this purpose to the appended claims.

In the single sheet of drawings, wherein like reference characters refer to like parts throughout the several views;

Fig. 1 is a side elevation in section of one form of complete indicating instrument embodying the invention and comprising a casing, a pressure-responsive mechanism, and the novel means for sealing the mechanism in the casing;

Fig. 2 is a front view of the instrument as illustrated in Fig. 1; and

Fig. 3 is a detailed section of the instrument as shown in Fig. 1, illustrating in detail the location and relative arrangement of the novel sealing and locking means.

Referring to the drawing and more particularly to Fig. 1, the instrument embodying the present invention is shown, by way of example, in the form of an altimeter having a pressure-responsive diaphragm 10 carried by a rod 11 mounted on a hollow rod 12 connected at right angles to a bottom spacing rod 13 and held in place in the rod 12 by a screw 14. Bottom spacing rod 13 is located between a face plate of mechanism top plate 15 and a rear frame member or plate 16 to which a top spacer 13a is connected by screws 17. The plates 15 and 16 are also connected together by a third spacer not shown in the drawing.

Adjustably mounted on a center post 18 on the top side of diaphragm 10 is a rod 19 to which is pivoted one end of a link 20 by a pin 21. A screw 22 fastens the rod 19 in place in the center post 18 after it has been properly adjusted. Rotatably connected to the other end of link 20 by means of threaded pin 23 and nuts 24 is a bi-metal element 25 which is adjustably mounted on a rock-shaft 26 by means of a rod 27 rotatably mounted in said rock-shaft and locked in adjusted position therein by a screw 28.

Rock-shaft 26 is mounted for rotation by extensions thereof, one of which is journaled in a boss 29 formed in the back plate 16 and the other end of which is journaled in the mechanism top plate 15.

Mounted on rock-shaft 26 adjacent rod 27 is a sector gear 30 meshing with a pinion 31 secured to or formed integral with a shaft 32 carrying a pointer 33 at one end thereof. Shaft 32 is journaled at one end in a plate 34 mounted on the front plate 15 by means of spacers 35 and screws 36 and is journaled at its other end in the face plate 15. Attached to shaft 32 is a collar 37 to which is fastened one end of a small spiral spring 38, the other end of the spring being connected to one of the spacers 35 in order to take up any back lash between the pinion 31 and sector gear 30.

Mounted on the rock-shaft 26 is a large spiral spring 39, one end of which is connected to one of the upper spacers 13 while the other end is connected to the rock-shaft 26 by means of a collar 40 and set screw 41 whereby the link 20 is continuously maintained in a state of tension or compression as desired.

The above-described mechanism is enclosed in a casing 42 which is provided with an inlet 43 connected, for example, to the static connection of a Pitot-static tube, whereby the pressure of the atmosphere is conducted into the casing 42 and to the outside of diaphragm 10.

In assembling the instrument into the casing 42, the mechanism top plate 15 comes into contact with an abutment 45 as will be set out in detail later, a clearance being provided between shoulder 44 and back plate 16 to allow for manufacturing variation.

A dial 46 (Fig. 2) is formed on the face plate 15 to cooperate with pointer 33. Lugs 47 are provided integrally with casing 42 to serve as fastening means whereby the complete instrument may be mounted in the instrument panel of an aircraft or the like.

The novel means of the present invention are now provided and comprise a novel sealing and locking means whereby the mechanism is sealed and locked in position in the casing 42 in contact with the abutment 44 and maintained in position with respect to abutment 45 whereby the changing pressure within the casing is maintained free of any changes due to the cockpit pressure or any extraneous pressures existing about the instrument.

Referring to Fig. 3, the novel sealing and locking means comprise a group of novel bearing pads 48 and 48a fastened to top plate 15 on opposite sides thereof all as described in the co-pending application of Leo V. Bjong, Serial No. 207,376, filed May 11, 1938. Split spacing ring 49 cooperating with shoulder 45a of casing 42 abuts one group of pads 48a whereby the other group 48 is held against shoulder 45. A rubber cushion 50 is held in a compressed condition and in resilient abutment against spacing ring 49 by means of a cushion retainer 51. A sealing ring 52 composed of brass or like material, abuts cushion retainer 51 at one side thereof and provides an inclined surface at the other side thereof which wedges the generically triangular shaped, rubber sealing gland 53 against the casing wall when the cover-glass 54 and the snap ring 55 are in place. An additional wedging action is obtained from the inclined surface of the rubber gland 53 which lies adjacent the cover-glass. A small amount of castor oil or similar lubricant is wiped on the gland 53 to lubricate the same and facilitate sealing. The ring 55 comprises a metallic resilient snap ring which is held in place between the cover-glass 54 and the lip 56 of casing 42 by its inherent resiliency.

Further novel means are provided comprising the slanting shoulder 57 formed in the casing 42 and serving as a support for the outer rim or base part of the triangular shaped, resilient sealing gland 53. The slanting shoulder or inclined surface 57 provides a reactive force coacting with the angular thrust of sealing ring 52 and the side thrust of cover-glass 54 upon the gland 53, whereby a more efficient sealing action is produced and the casing is most effectively sealed.

The rubber cushion 50 held in compressed relation against the spacing ring 49, reacts against the brass ring 52 which thereby exerts a force upon one side of the triangular, rubber sealing ring 53 while cover-glass 54 is resiliently urged by snap ring 55 against the opposite side of the triangular rubber sealing gland 53 to thereby provide a most effective seal whereby air leakage to the interior of the instrument is prevented. The inherently resilient construction of the composite sealing means serves to take up any play existing in the casing due to tolerances permitted in the manufacture thereof and serves to effectively lock the operating mechanism in place in the casing against all vibration. The additional effect of shoulder 57 produces a complete sealing effect whereby all pressure leakage is obviated.

Thus the novel means described provide a novel closure which is effective at all temperatures and under all conditions of vibration to seal the casing from all exterior pressure changes and to lock the mechanism in place.

Novel means are therefore provided whereby the actuating mechanism of a pressure-responsive indicating instrument is mechanically locked in place and effectively sealed against all changes in pressure which might affect the interior pressure of the instrument casing.

Although but one embodiment of the invention has been illustrated and described, other changes and modifications in form, materials, and relative arrangement of parts, which will now appear to those skilled in the art, may be made without departing from the scope of the invention. Reference is therefore to be had to the appended claims for a definition of the limits of the invention.

What is claimed is:

1. In a pressure-responsive indicating instrument comprising a casing having a shoulder on the inside thereof and an operating mechanism located in said casing, the combination of means for mechanically locking and pneumatically sealing said mechanism in said casing, comprising a mechanism plate abutting said shoulder, a spacing ring, a metallic sealing ring presenting an inclined surface at one side thereof, sealing means between said spacing ring and the other side of said sealing ring, a resilient sealing gland presenting an inclined surface on one side thereof cooperating with said inclined surface on said sealing ring, an inclined surface formed on the other side of said sealing gland, a slanting shoulder within said casing abutting the outer edge of said gland, a cover-glass, and means for urging said cover-glass against said last-named inclined surface to force said gland against said slanting shoulder and the inclined surface of said metallic sealing ring.

2. In a pressure-responsive indicating instrument comprising a casing having a shoulder on the inside thereof and an operating mechanism located in said casing for presenting an indication, the combination of means for sealing said mechanism in said casing, including a mechanism plate abutting said shoulder, a spacing ring urging said plate against said shoulder, a resilient sealing gland, an inclined surface on the interior wall of said casing cooperating with one side of said sealing gland, whereby said gland is held against said surface, and means including a cover-glass for holding said sealing gland in an operative position against said interior wall and simultaneously producing a thrust upon said spacing ring.

3. In a pressure-responsive indicating instrument comprising a casing and an operating mechanism located in said casing for presenting an indication, the combination of means for sealing said mechanism in said casing, including a cover-glass, a removable sealing ring between said mechanism and said glass, a compressible sealing gland between said sealing ring and said glass, an inclined surface on the interior wall of said casing, an inclined surface on said gland, and means urging said cover-glass against said inclined surface on said gland, whereby said gland is forced into sealing relation with the inclined surface on said casing.

4. In a pressure-responsive indicating instrument comprising a casing and an operating mechanism located in said casing for presenting an indication, the combination of means for sealing said casing, including a cover-glass, a removable metallic sealing ring, a triangular-shaped resilient sealing gland between said ring and said cover-glass, and means including an inclined surface on the interior wall of said casing cooperating with said cover-glass and ring to urge said sealing gland into compressed relation with said wall to seal said casing.

5. In a pressure-responsive indicating instrument comprising a casing and an operating mechanism located in said casing for presenting an indication, the combination of means for sealing said casing, including a cover-glass, a resilient sealing gland, a slanting shoulder on the interior wall of said casing, a removable sealing ring, and means for urging said cover-glass against said sealing gland to force said gland against said ring and into sealing relationship with said shoulder.

RUDOLPH G. SCHAAF, Jr.